United States Patent
Deng

(10) Patent No.: US 11,144,787 B2
(45) Date of Patent: Oct. 12, 2021

(54) OBJECT LOCATION METHOD, DEVICE AND STORAGE MEDIUM BASED ON IMAGE SEGMENTATION

(71) Applicant: Shenzhen Dorabot Inc., Shenzhen (CN)

(72) Inventor: YaoHuan Deng, Shenzhen (CN)

(*) Notice: Subject to any disclaimer, the term of this patent is extended or adjusted under 35 U.S.C. 154(b) by 243 days.

(21) Appl. No.: 16/437,287

(22) Filed: Jun. 11, 2019

(65) Prior Publication Data
US 2020/0057917 A1    Feb. 20, 2020

(30) Foreign Application Priority Data
Aug. 17, 2018    (CN) .......................... 201810943480.3

(51) Int. Cl.
| | | |
|---|---|---|
| *G06K 9/62* | (2006.01) | |
| *G06T 7/11* | (2017.01) | |
| *G06T 7/70* | (2017.01) | |
| *G06N 3/04* | (2006.01) | |

(52) U.S. Cl.
CPC .......... *G06K 9/6256* (2013.01); *G06K 9/6267* (2013.01); *G06N 3/04* (2013.01); *G06T 7/11* (2017.01); *G06T 7/70* (2017.01); *G06T 2207/20081* (2013.01); *G06T 2207/20084* (2013.01)

(58) Field of Classification Search
CPC ............ G06K 9/6256; G06K 9/00771; G06K 9/6262; G06K 9/00718; G06K 9/52; G06K 9/6267; G06K 9/6269; G06K 2209/05; G06K 9/6201; G06K 9/6263; G06K 9/6276; G06K 9/00201; G06K 9/00288; G06K 9/00335; G06K 9/00536; G06K 9/4628; G06K 9/4671; G06K 9/6215; G06K 9/6223
USPC ........................................................ 382/159
See application file for complete search history.

(56) References Cited

U.S. PATENT DOCUMENTS

| | | | |
|---|---|---|---|
| 7,903,857 B2* | 3/2011 | Huang ................. | G06K 9/4671 382/131 |
| 2020/0118423 A1* | 4/2020 | Moura ................. | G08G 1/0116 |
| 2020/0293784 A1* | 9/2020 | Zhou .................... | G06K 9/6215 |

* cited by examiner

*Primary Examiner* — Ajibola A Akinyemi

(57) ABSTRACT

The invention discloses an object location method, device and storage medium based on image segmentation, the object location method comprises: collecting and labeling training images to obtain a trained database; designing a fully convolutional neural network (FCNN); training the FCNN to obtain a target neural network, by inputting the trained database into the FCNN; labeling and locating object images, based on the target neural network. The method is using the training samples collected in the application scenario to train the FCNN, so it can obtain an optimized FCNN and achieve higher robustness and segmentation accuracy. Particularly, the object segmentation method in the embodiment can perform high-precision segmentation on a plurality of overlapping envelope regions when processing envelopes in a logistics system, and an envelope on the top layer is accurate singulation, allowing the robot to grab only one envelope each time, greatly improving the accuracy and experience of logistics sorting.

12 Claims, 4 Drawing Sheets

OBJECT LOCATION METHOD, DEVICE AND STORAGE MEDIUM BASED ON IMAGE SEGMENTATION

CROSS REFERENCE TO RELATED APPLICATIONS

The present application claims priority to Chinese Patent Application No. CN201810943480.3, filed to the Chinese Patent Office on Aug. 17, 2018, and entitled "Object Location Method, Device and Storage Medium Based on Image Segmentation," the disclosure which is incorporated herein by reference in its entirety.

FIELD OF THE INVENTION

The invention pertains to the field of robotics and sorting, and in particularly relates to an object location method, device and storage medium based on image segmentation.

BACKGROUND OF THE INVENTION

With the development of the automation in logistics, using robots to sort goods is becoming more and more popular. More and more goods need to be sorted quickly. In the real scenario of logistics, many goods are stacked together and need to be singulation.

There are some existing algorithms to solve this problem, but the existing algorithms of image segmentation usually only calculate a rough border of rectangular which cannot cover all the pixels of the object and include so much background information, resulting in inaccurate position and inaccurate pose.

SUMMARY OF THE INVENTION

The purpose of the invention is to provide an object location method, device and storage medium based on image segmentation, aiming at making the algorithm of image segmentation segment the object at the pixel level, so as to achieve accurate position of target object and identify the pose accurately.

One aspect of the present disclosure is related to an object location method based on image segmentation. In accordance with an aspect of the embodiment, the object location method based on image segmentation for a logistics system, the method comprises: collecting training images and labeling the training images to obtain a trained database; designing a fully convolutional neural network; training the fully convolutional neural network to obtain a target neural network, by inputting the trained database into the fully convolutional neural network; labeling and locating object images, based on the target neural network.

In accordance with one embodiment of the present disclosure, the collecting training images and labeling the training images, further comprises: capturing, the training images of a plurality of overlap training objects, by at least one camera from different angles.

In accordance with one embodiment of the present disclosure, labeling, the training object on the top layer in the training images, that has a larger visible area than a default.

In accordance with one embodiment of the present disclosure, the training object is manually labeled at a pixel level.

In accordance with one embodiment of the present disclosure, the fully convolutional neural network, includes convolution layers, pooling layers and deconvolution layers.

In accordance with one embodiment of the present disclosure, the training the fully convolutional neural network to obtain a target neural network, by inputting the trained database into the fully convolutional neural network, further comprises: obtaining, a target deconvolution layer, by inputting instructions into the fully convolutional neural network to train the deconvolution layer, based on the output of the fully convolutional neural network.

In accordance with one embodiment of the present disclosure, the target neural network including the target deconvolution layer, and labeling and locating object images, based on the target neural network, further comprises: obtaining, a plurality of pixels of the object images, through a down-sampling of the target neural network; classifying, each pixel in the target neural network, to obtain classification output of the plurality of pixels; obtaining, classified images, by a up-sampling of the target deconvolution layer, the classified images having the same size as the original object images.

In accordance with one embodiment of the present disclosure, the labeling and locating object images, based on the target neural network, further comprises: determining and labeling the boundary of the target object in the classified images according to the classification output of the plurality of pixels.

In accordance with one embodiment of the present disclosure, the determining and labeling the boundary of the target object in the classified images, further comprises: fitting a plurality of rectangular areas, based on the classified pixel point clouds, and obtaining the normal of each rectangular area; taking a rectangular area as the reference plane, which the rectangular area satisfies a preset condition, and taking other rectangular areas as correlative planes, which the normals of the other rectangular areas are perpendicular to the normal of the reference plane; fitting the area of the target object, based on both the reference plane and the correlative planes.

In accordance with one embodiment of the present disclosure, obtaining the target object, based on the area of the target object and placing the target object at a target position by a robot.

Another aspect of the present disclosure is related to an object location device based on image segmentation. In accordance with one embodiment of the present disclosure, the device includes a processor, a memory, and a program of the object location based on image segmentation stored on the memory and operable on the processor, the program of the object location based on image segmentation being executed by the processor to implement the following method: collecting training images and labeling the training images to obtain a trained database; designing a fully convolutional neural network; training the fully convolutional neural network to obtain a target neural network, by inputting the trained database into the fully convolutional neural network; labeling and locating object images, based on the target neural network.

Another aspect of the present disclosure is related to a storage medium. In accordance with one embodiment of the present disclosure, an object location program based on image segmentation is stored on the storage medium, the object location program being executed by the processor to implement the following method: collecting training images and labeling the training images to obtain a trained database; designing a fully convolutional neural network; training the fully convolutional neural network to obtain a target neural network, by inputting the trained database into the fully convolutional neural network; labeling and locating object images, based on the target neural network.

The purpose of the invention is to provide an object location method, device and storage medium based on image segmentation, which using the training samples collected in the actual application scenario to train the fully convolutional neural network model. In this way, after iterative training, the technical solution of image segmentation in the embodiment of the present invention can obtain an optimized fully convolutional neural network model. Based on this, the object segmentation method based on image segmentation in the embodiment of the present invention can achieve higher robustness and segmentation accuracy. In particular, the object segmentation method based on image segmentation in the embodiment of the present invention can perform high-precision segmentation on a plurality of overlapping envelope regions when processing envelopes in a logistics system, and an envelope on the top layer is accurate singulation, allowing the robot to grab only one envelope each time, greatly improving the accuracy and experience of logistics sorting.

BRIEF DESCRIPTION OF THE DRAWINGS

The invention will be described with reference to the accompanying drawings. These and/or other aspects and advantages of the invention will become apparent and more readily appreciated from the following description of the embodiments, taken in conjunction with the accompanying drawings. Obviously, the drawings in the following description are only some embodiments of the embodiments of the invention, and it will be apparent to those skilled in the art that other drawings may be obtained in accordance with the structures illustrated in the drawings without departing from the scope of the invention.

DETAILED DESCRIPTION OF THE INVENTION

Figure 1:
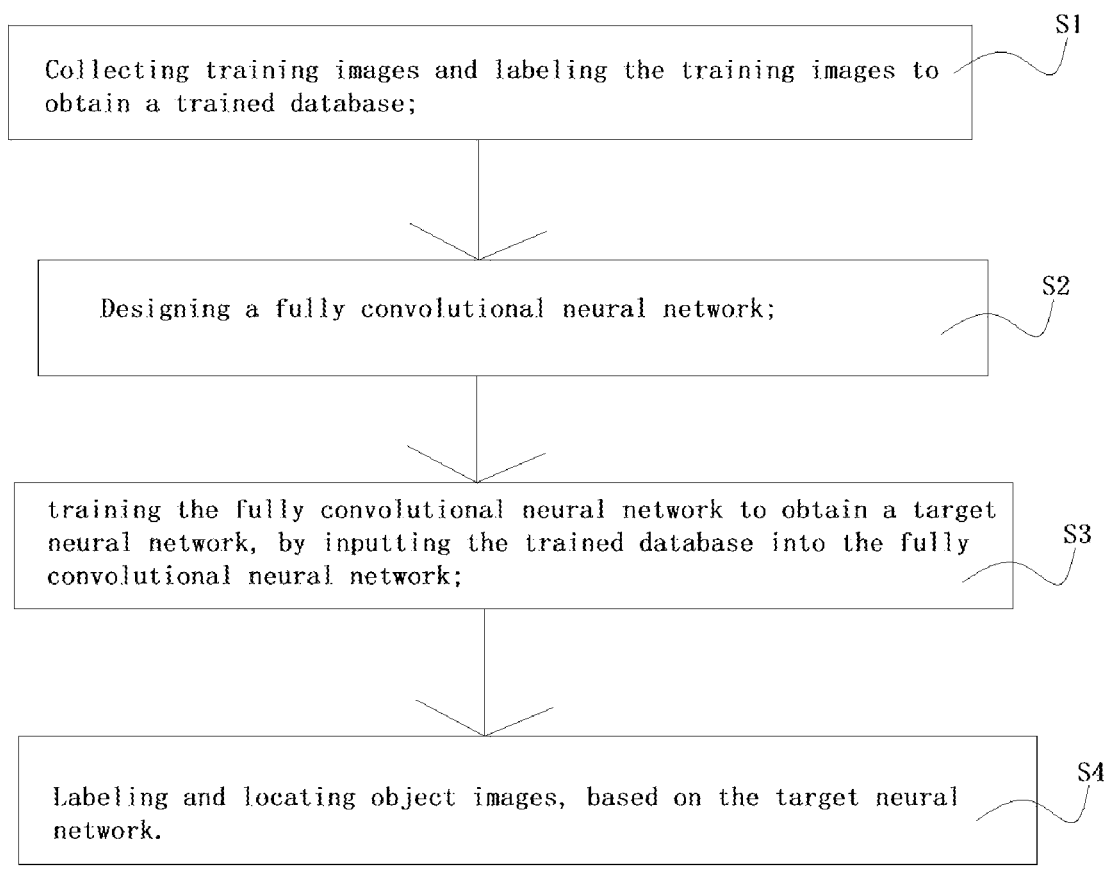
FIG. 1 is a flow diagram illustrating techniques according to one embodiment of the present invention.

The invention will be further described below in details with reference to the figures and embodiments.

Embodiment 1

The embodiment is provided with an object location method based on image segmentation, which is used in a logistics system and accurately segment the target object for the robot to grab.

Referring generally to FIG. 1 to FIG. 4, the object location method based on image segmentation according to a preferred embodiment of the present invention comprises:

S1, Collecting training images and labeling the training images to obtain a trained database;

Further, for an example, a scenario of envelopes sorting in logistics, a plurality of envelopes are placed in different states based on the real situation of multiple envelopes during sorting, resulting in thousands of training images of envelopes being obtained and Further more training classification models being obtained by more training images of envelopes. Multiple training classification models include object states in multiple modalities, multiple angles, multiple distances, and multiple ray types, thereby enabling training results to be more robust.

Specifically, for example, three envelopes overlap each other, and the envelope on the top is not covered by anything, and the training images are collected by means of a plurality of cameras taking the first scene images from different angles; or four envelopes overlap each other, and 70% area of one envelope on the surface is not covered by anything, and the training images are collected by means of a plurality of cameras taking the second scene images from different angles. This step is to collect diverse training samples in the actual application scenario, and the training samples are manually labeled at a pixel level, and at last all the training samples can form a trained database.

More specific, the labeling is perform manually, which is to label the pixel points of the objects to be classified in the training images. Wherein, in this embodiment, labeling the training object on the top layer in the training images, that has a larger visible area than a default, and the default is that the integrity of the object is 70% or more than 70%. The integrity refers to the fact that a part of the training object on the top layer in the training images is not covered by anything. The training can be more focused so that the vision system can identify the targeted object by means of an uncovered area of the object in the training images with an integrity of 70%, and when the vision system identifies an object in the original image, it can only identify the object that can be grasped on the top layer.

S2, Designing a fully convolutional neural network;

Specifically, the fully convolutional neural network used herein is an artificial neuron with simplified functions of biological neurons. Artificial neurons can be connected by a connection line with connection weight. Neural networks can perform at least some degree of human-like recognition through artificial neurons, or recognition functions of training processes, or training processes. Artificial neurons are also called nodes.

In other words, the fully convolutional neural network, includes convolution layers, pooling layers and deconvolution layers. The convolution layers are configured to receive input for performing training; and the convolution layers are connected to the pooling layers and transfer the input to the pooling layers. The deconvolution layers are configured to generate the output of the fully convolutional neural network, based on the signals received from the pooling layers. The pooling layers which are between the convolution layers and the deconvolution layers, are configured to change the training data, transmitted through the input layer, to the predicted value.

S3, Training the fully convolutional neural network to obtain a target neural network, by inputting the trained database into the fully convolutional neural network;

In other words, obtaining a target deconvolution layer, by inputting instructions into the fully convolutional neural network to train the deconvolution layer, based on the output of the fully convolutional neural network.

Meanwhile, the fully convolutional neural network includes an image model, the image model refers to a model that is trained to generate a desired output based on input and indicates parameters in a machine learning structure. The machine learning structure can be expressed as functions that can generate predictions, decisions, and/or classifications of one or more parameters of input data to a function based on training processing, as output data.

In the embodiment of the present invention, firstly, the training images are input into the image model of the fully convolutional neural network through the convolution layers. Secondly, the pooling layers extract a plurality of pixels of the training images and transmit the plurality of pixels to the deconvolution layers, judging whether the output images are the same size as the input training images by observing the output images of the deconvolution layer, and obtaining the target deconvolution by adjusting the parameters of the fully convolutional neural network continuously to make the output images of the deconvolution be the same size as the input training images.

S4, Labeling and locating object images, based on the target neural network.

Specifically, the target neural network including the target deconvolution layers, and the trained target neural network processes the target object to be acquired by the manipulator in the logistics system, so that the target neural network can classify the pixel points of the target object. Meanwhile, obtaining a plurality of pixels of the object images, through a down-sampling of the target neural network, and classifying each pixel in the target neural network, to obtain classification output of the plurality of pixels, and obtaining classified images, by a up-samlping of the target deconvolution layer, and the classified images having the same size as the original object images, can enable the target neural network to classify efficiently and accurately, and also obtain the set of pixels corresponding to each object. Therefore, when the subsequent steps are performed, the object location method can perform positioning accurately, and obtain an accurate pose.

Figure 2:
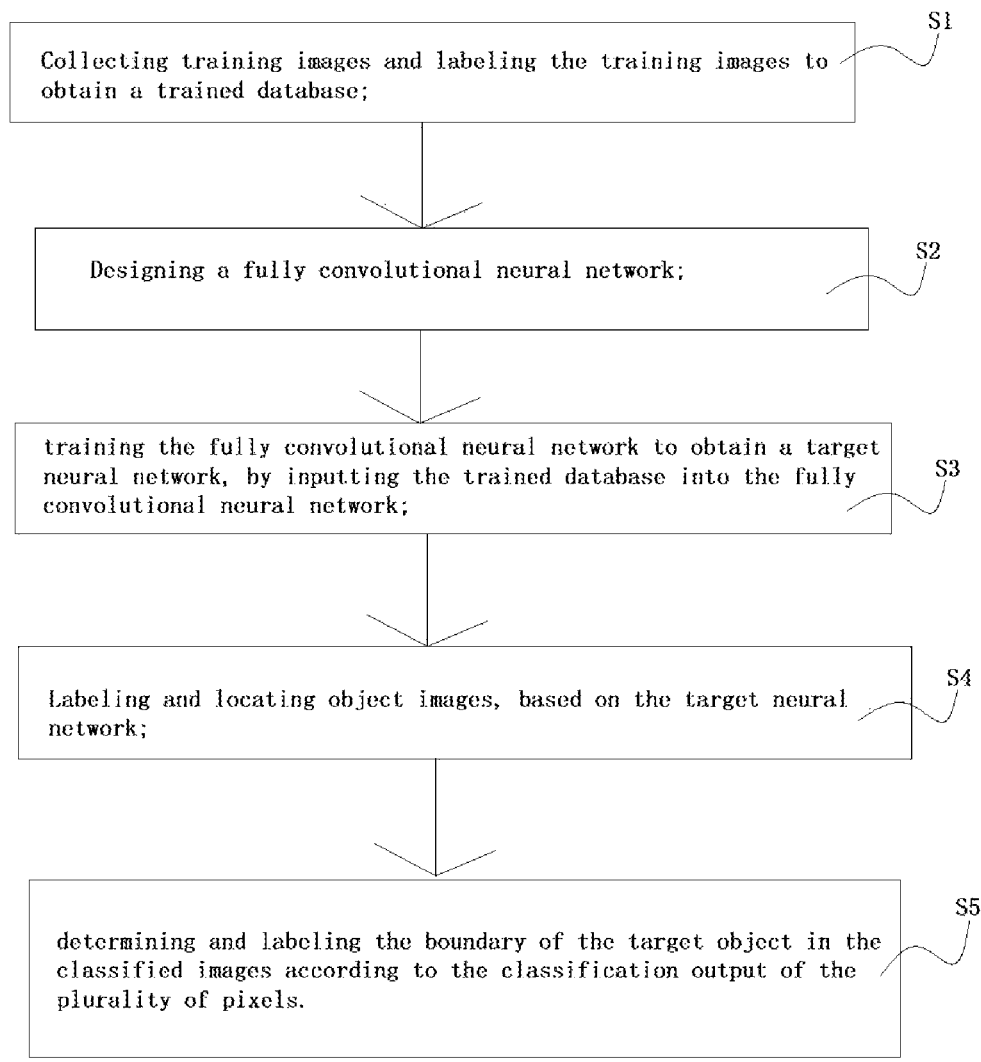
FIG. 2 is another flow diagram illustrating techniques according to one embodiment of the present invention, which includes one more step than the flow diagram shown in FIG. 1.

Along with FIG. 2, particularly, the object location method based on image segmentation further comprises: S5, determining and labeling the boundary of the target object in the classified images according to the classification output of the plurality of pixels.

Further, Fitting a plurality of rectangular areas, based on the classified pixel point clouds, and obtaining the normal of each rectangular area. Firstly, merging the classified pixel point clouds to obtain the merged pixel point clouds with the full length, width and height information of the target object, and secondly a plurality of rectangular regions are fitted according to the merged pixel point clouds, and then obtain the normal corresponding to each rectangular region. As described above, the pixel point clouds can be separated by merging the pixel point clouds to fit a plurality of rectangular regions, and the pixel point clouds belonging to the same plane can be gathered, and then the rectangular regions can be fitted according to the edges of the gathered pixel point clouds.

In the present embodiment, taking a rectangular area as the reference plane, which the rectangular area satisfies a preset condition, and taking other rectangular areas as correlative planes, which the normals of the other rectangular areas are perpendicular to the normal of the reference plane. Wherein, the preset condition can be an area threshold the rectangular area is above, or can be a density threshold that the density of the pixel point clouds which gather to form the rectangular regions is above, or can be a preset position of the image whether the target object is located, and so on. By filtering the preset conditions, a rectangular area belonging to the target object can be obtained, which is marked as the reference plane. Correspondingly, since the envelope in this embodiment has a rectangular shape, the normals of the other rectangular regions are perpendicular to the normal of the envelope marked as correlative planes.

Figure 3:
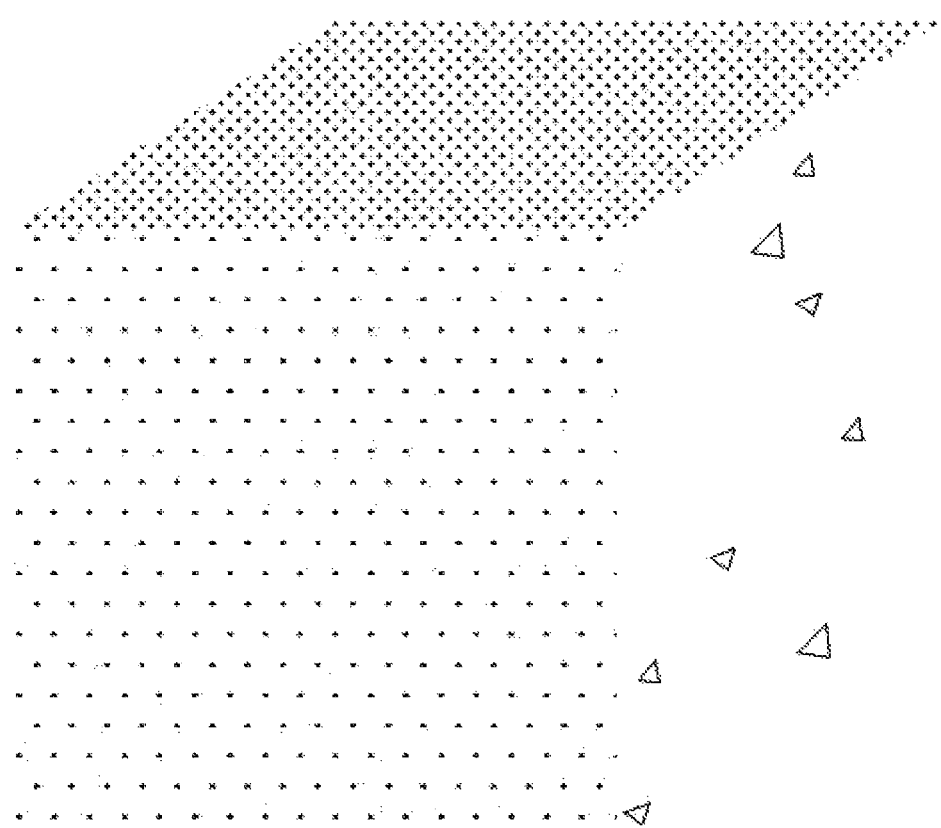
FIG. 3 is a diagram illustrating an example object that is labeled and located by one embodiment of the present invention.
Figure 4:
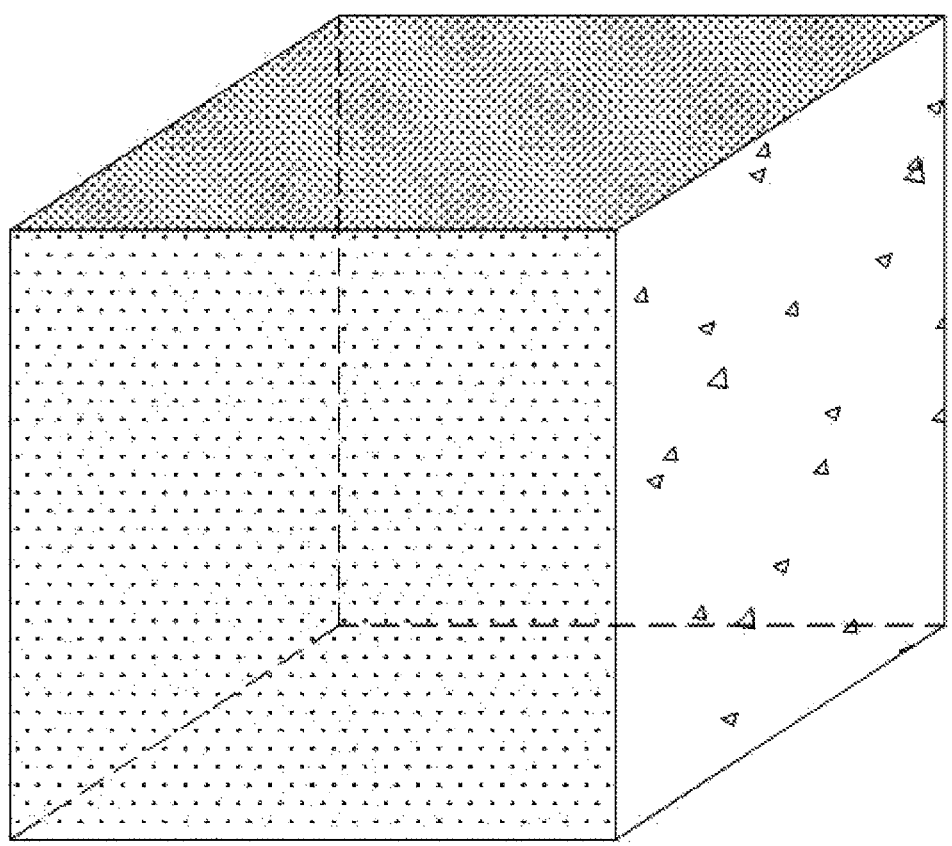
FIG. 4 is another diagram illustrating an example object that is labeled and located by one embodiment of the present invention, which includes more steps than the diagram shown in FIG. 3.

In the present embodiment, after finding the reference plane and the correlative planes, fit the area of the target object, based on both the reference plane and the correlative planes. More specifically, the target object is an envelope containing six planes, If the reference plane and the correlative planes totally include three planes, then the other three planes can be estimated based on the edge information of the reference plane and the correlative planes, thereby completing the fitting of the envelope region, as shown in FIG. 3. In another embodiment of the present invention, If the reference plane and the correlative planes totally include four planes, then the other two planes can be estimated based on the edge information of the reference plane and the correlative planes, thereby completing the fitting of the envelope region, and soon.

In the present embodiment, obtaining the target object, based on the area of the target object and placing the target object at a target position by a robot. In other words, the method can identify the envelop to be placed at a target position, which can solve the existing problems.

The envelope fitting method provided in this embodiment can obtain the pixel point clouds of the envelope by adopting the depth camera. Firstly, extracting the plane and fitting the rectangular area through the pixel point clouds, and secondly identifying the rectangular area belonging to the envelope, and finally identifying the rectangular areas to fit the envelope area, which greatly improves the accuracy of identifying the envelope shape and improves the success rate of robot sorting.

The embodiment is provided with an object location method based on image segmentation, by collecting training images to form a trained database, the fully designed convolutional neural network is trained continuously by the trained database, so that the fully designed convolutional neural network can become a target neural network. Further, the target neural network can apply to the logistics scenario and then identify the target object to be obtain by the robot in the logistics system. More specifically, firstly capture the target image of the target object through the vision system, and secondly after the target image of the target object is input the target neural network, the target neural network labels and locates the target image to obtain the classification result of the pixel of the target object, and finally the boundary and position of the target object are sent to the robot, allowing the robot to accurately grab the target object, by the system algorithm being used to fit the classification result of the pixels to obtain the boundary and position of the target object.

Embodiment 2

Referring to FIG. 1, the embodiment of the invention is also provided with an object location device based on image segmentation, the device includes a processor, a memory, and a program of the object location based on image segmentation stored on the memory and operable on the processor. When the program of the object location based on image segmentation is executed by the processor, the following steps are realized:

S1, Collecting training images and labeling the training images to obtain a trained database;

S2, Designing a fully convolutional neural network;

S3, training the fully convolutional neural network to obtain a target neural network, by inputting the trained database into the fully convolutional neural network;

S4, Labeling and locating object images, based on the target neural network.

The embodiment is provided with an object location device based on image segmentation, by collecting training images to form a trained database, the fully designed convolutional neural network is trained continuously by the trained database, so that the fully designed convolutional neural network can become a target neural network. Further, the target neural network can apply to the logistics scenario and then identify the target object to be obtain by the robot in the logistics system. More specifically, firstly capture the target image of the target object through the vision system, and secondly after the target image of the target object is input the target neural network, the target neural network labels and locates the target image to obtain the classification result of the pixel of the target object, and finally the boundary and position of the target object are sent to the robot, allowing the robot to accurately grab the target object, by the system algorithm being used to fit the classification result of the pixels to obtain the boundary and position of the target object.

It should be noted that the embodiment of the object location device based on image segmentation in the present embodiment has the same concept as the embodiment of the above-mentioned method. The specific implementation procedure of the object location device based on image segmentation is the same as the detailed description of the method embodiments, and the technical characteristics in the method embodiments are applicable in the embodiment of object location device based on image segmentation. Or it can be adjusted with reference to the above embodiment of the object segmentation method based on image segmentation. The technical characteristics of the adjustment and the beneficial effects of these technical features can be found in the embodiment of the object segmentation method based on image segmentation and it will not be repeated herein.

Embodiment 3

Referring to FIG. 1, the embodiment of the invention is also provided with a computer readable storage medium; and an image segmentation program is stored on the computer readable storage medium. The image segmentation program is executed by the processor to implement the following steps:

S1, Collecting training images and labeling the training images to obtain a trained database;

S2, Designing a fully convolutional neural network;

S3, training the fully convolutional neural network to obtain a target neural network, by inputting the trained database into the fully convolutional neural network;

S4, Labeling and locating object images, based on the target neural network.

The embodiment is provided with a computer readable storage medium, by collecting training images to form a trained database, the fully designed convolutional neural network is trained continuously by the trained database, so that the fully designed convolutional neural network can become a target neural network. Further, the target neural network can apply to the logistics scenario and then identify the target object to be obtain by the robot in the logistics system. More specifically, firstly capture the target image of the target object through the vision system, and secondly after the target image of the target object is input the target neural network, the target neural network labels and locates the target image to obtain the classification result of the pixel of the target object, and finally the boundary and position of the target object are sent to the robot, allowing the robot to accurately grab the target object, by the system algorithm being used to fit the classification result of the pixels to obtain the boundary and position of the target object.

It should be noted that the embodiment of the computer readable storage medium in the present embodiment has the same concept as the embodiment of the above-mentioned method. The specific implementation procedure of the computer readable storage medium is the same as the detailed description of the method embodiments, and the technical characteristics in the method embodiments are applicable in the embodiment of the computer readable storage medium. Or it can be adjusted with reference to the above embodiment of the object segmentation method based on image segmentation. The technical characteristics of the adjustment and the beneficial effects of these technical features can be found in the embodiment of the object segmentation method based on image segmentation and it will not be repeated herein.

It is to be understood that in this article, the term "include", "include" or any other variant thereof is intended to cover non-exclusive inclusion, so the process, method, article or device that includes a series of elements includes not only those elements, but also other elements that are not expressly listed, or elements that are inherent to such processes, methods, objects or devices. Without further limitation, a limited element defined by the phrase "including one . . . " does not exclude the presence of additional identical elements in a process, method, article, or device that include such elements.

The embodiment sequence number of the invention is only for description and does not represent the advantages and disadvantages of the embodiment.

Through the description of the above embodiments, it is clear to those skilled in the art that the above embodiments can be implemented by means of software plus the necessary general hardware platform, and of course, can be implemented by means of hardware, but in many cases the former is a better implementation. Based on such understanding, the technical solution of the embodiment of the invention, or the part contributing to the prior art, may be expressed in the form of a software product. This computer software product is stored in a storage medium such as ROM/RAM, disk, CD-ROM, Includes instructions for a terminal (which may be a mobile phone, computer, server, air conditioner, or network device) to perform the methods described in each embodiment of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An object location method based on image segmentation for a logistics system, wherein the method comprising: Collecting training images and labeling the training images to obtain a trained database; Designing a fully convolutional neural network; training the fully convolutional neural network to obtain a target neural network, by inputting the trained database into the fully convolutional neural network; Labeling and locating object images, based on the target neural network;

the fully convolutional neural network, includes convolution layers, pooling layers and deconvolution layers;

the training the fully convolutional neural network to obtain a target neural network, by inputting the trained database into the fully convolutional neural network, further comprises: obtaining, a target deconvolution layer, by inputting instructions into the fully convolutional neural network to train the deconvolution layer, based on the output of the fully convolutional neural network;

wherein the target neural network including the target deconvolution layer, and labeling and locating object images, based on the target neural network, further comprises: obtaining, a plurality of pixels of the object images, through a down-sampling of the target neural network; classifying, each pixel in the target neural network, to obtain classification output of the plurality of pixels; obtaining, classified images, by a up-sampling of the target deconvolution layer, the classified images having the same size as the original object images.

2. The object location method based on image segmentation as defined in claim 1, wherein the collecting training images and labeling the training images, further comprises: capturing, the training images of a plurality of overlap training objects, by at least one camera from different angles.

3. The object location method based on image segmentation as defined in claim 2, wherein Labeling, the training object on the top layer in the training images, that has a larger visible area than a default.

4. The object location method based on image segmentation as defined in claim 3, wherein the training object is manually labeled at a pixel level.

5. The object location method based on image segmentation as defined in claim 1, wherein the labeling and locating object images, based on the target neural network, further comprises: Determining and labeling the boundary of the target object in the classified images according to the classification output of the plurality of pixels.

6. The object location method based on image segmentation as defined in claim 5, wherein the determining and labeling the boundary of the target object in the classified images, further comprises: Fitting a plurality of rectangular areas, based on the classified pixel point clouds, and obtaining the normal of each rectangular area; taking a rectangular area as the reference plane, which the rectangular area satisfies a preset condition, and taking other rectangular areas as correlative planes, which the normals of the other rectangular areas are perpendicular to the normal of the reference plane; Fitting the area of the target object, based on both the reference plane and the correlative planes.

7. The object location method based on image segmentation as defined in claim 6, wherein obtaining the target object, based on the area of the target object and placing the target object at a target position by a robot.

8. An object location device based on image segmentation, wherein the device includes a processor, a memory, and a program of the object location based on image segmentation stored on the memory and operable on the processor, the program of the object location based on image segmentation being executed by the processor to implement the following method: Collecting training images and labeling the training images to obtain a trained database; Designing a fully convolutional neural network; training the fully convolutional neural network to obtain a target neural network, by inputting the trained database into the fully convolutional neural network; Labeling and locating object images, based on the target neural network;

the fully convolutional neural network, includes convolution layers, pooling layers and deconvolution layers;

the training the fully convolutional neural network to obtain a target neural network, by inputting the trained database into the fully convolutional neural network, further comprises: obtaining, a target deconvolution layer, by inputting instructions into the fully convolutional neural network to train the deconvolution layer, based on the output of the fully convolutional neural network;

wherein the target neural network including the target deconvolution layer, and labeling and locating object images, based on the target neural network, further comprises: obtaining, a plurality of pixels of the object images, through a down-sampling of the target neural network; classifying, each pixel in the target neural network, to obtain classification output of the plurality of pixels; obtaining, classified images, by a up-sampling of the target deconvolution layer, the classified images having the same size as the original object images.

9. The object location device based on image segmentation as defined in claim 8, wherein the collecting training images and labeling the training images, further comprises: capturing, the training images of a plurality of overlap training objects, by at least one camera from different angles.

10. The object location device based on image segmentation as defined in claim 9, wherein labeling, the training object on the top layer in the training images, that has a larger visible area than a default.

11. The object location device based on image segmentation as defined in claim 10, wherein the training object is manually labeled at a pixel level.

12. The object location device based on image segmentation as defined in claim 8, wherein the labeling and locating object images, based on the target neural network, further comprises: determining and labeling the boundary of the target object in the classified images according to the classification output of the plurality of pixels.

* * * * *